United States Patent
Xia

(10) Patent No.: US 9,862,314 B2
(45) Date of Patent: Jan. 9, 2018

(54) WARNING TRIANGLE STAND

(71) Applicant: Shanghai Karstone energy technology co., Ltd., Shanghai (CN)

(72) Inventor: Tie Hong Xia, Shanghai (CN)

(73) Assignee: Shanghai Karstone Energy Technology Co., Ltd., Shanghai (CN)

( * ) Notice: Subject to any disclaimer, the term of this patent is extended or adjusted under 35 U.S.C. 154(b) by 0 days.

(21) Appl. No.: 15/412,385

(22) Filed: Jan. 23, 2017

(65) Prior Publication Data

US 2017/0210287 A1    Jul. 27, 2017

(30) Foreign Application Priority Data

Jan. 25, 2016  (CN) .................... 2016 2 0067628 U
Dec. 28, 2016  (CN) .................... 2016 2 1457512 U

(51) Int. Cl.
*B60Q 7/00*        (2006.01)
*G08G 1/0955*     (2006.01)

(52) U.S. Cl.
CPC ............. *B60Q 7/00* (2013.01); *G08G 1/0955* (2013.01)

(58) Field of Classification Search
CPC ................................ B60Q 7/00; G08G 1/0955
USPC ........... 340/907, 925, 931, 631, 908, 815.45
See application file for complete search history.

(56) References Cited

U.S. PATENT DOCUMENTS

| | | | |
|---|---|---|---|
| 2006/0103543 A1* | 5/2006 | Chen ................ | B60Q 7/00 340/815.45 |
| 2007/0011928 A1* | 1/2007 | Wang ............... | B60Q 7/00 40/612 |
| 2015/0073623 A1* | 3/2015 | Zhang .............. | G09F 13/16 701/2 |
| 2015/0314728 A1* | 11/2015 | Kim ................. | B60Q 7/00 116/63 T |

* cited by examiner

*Primary Examiner* — Steven Lim
*Assistant Examiner* — Mancil Littlejohn, Jr.
(74) *Attorney, Agent, or Firm* — Muncy, Geissler, Olds & Lowe, P.C.

(57) ABSTRACT

A warning triangle stand includes a triangular plate provided with a reflector, an LED lamp, a switch, and a power source. The reflector and the LED lamp are disposed on the front of the triangular plate. The power source is disposed inside the triangular plate. The power source is electrically connected with the LED lamp. The triangular plate includes a main plate, a left plate, a right plate, and an upper plate. The left plate and the right plate are hinged to two sides of the main plate. The upper plate is hinged to an upper end of the main plate. The switch is used to control the triangular plate to be in a folded state or an unfolded state. The triangular plate can be unfolded through the switch, which is fast and convenient. The LED lamp is used in cooperation with the reflector to provide a warning effect.

9 Claims, 3 Drawing Sheets

WARNING TRIANGLE STAND

FIELD OF THE INVENTION

The present invention relates to a traffic warning sign, and more particularly to a warning triangle stand.

BACKGROUND OF THE INVENTION

Traffic signs are very commonly used to maintain traffic safety order and provide warnings. However, even if the traffic signs are easy to use, many existing traffic signs have some problems, such as low efficiency and inconvenience.

First of all, the traffic signs use reflective materials to provide a warning effect. But in the dark, it will inevitably affect the efficiency of traffic signs. Besides, most of the traffic signs are triangular. When in use, the traffic signs cooperate with brackets or fasteners. The structure is complex, not beneficial for carrying and storage.

Accordingly, the inventor of the present invention has devoted himself based on his many years of practical experiences to solve these problems.

SUMMARY OF THE INVENTION

The primary object of the present invention is to provide a warning triangle stand which can be unfolded through a switch to achieve a better warning effect and can be widely used in our daily life.

In order to achieve the aforesaid object, the warning triangle stand of the present invention comprises a triangular plate. The triangular plate is provided with a reflector, an LED lamp, and a power source. The reflector and the LED lamp are disposed on a front of the triangular plate, respectively. The power source is disposed inside the triangular plate. The power source is electrically connected with the LED lamp.

The triangular plate includes a main plate, a left plate, a right plate, and an upper plate. The left plate and the right plate are hinged to two sides of the main plate. The upper plate is hinged to an upper end of the main plate. Hinge joints between the main plate and the left plate, the right plate and the upper plate are provided with torsion springs, respectively. The front of the main plate is provided with a switch. The switch is provided with three engaging buckles. The left plate, the right plate and the upper plate are provided with engaging recesses respectively to mate with the engaging buckles. The engaging recesses are located at three vertexes of the triangular plate, respectively.

The switch is used to control the triangular plate to be in a folded state or an unfolded state. In the folded state, the left plate, the right plate and the upper plate are folded and stored in the area of the main plate. The engaging recesses of the left plate, the right plate and the upper plate are buckled by the engaging buckles of the switch. In the unfolded state, the main plate, the left plate, the right plate, and the upper plate are located on the same plane and arranged in the faun of a triangle.

Preferably, the main plate includes a magnetic induction switch therein. The magnetic induction switch, the power source and the LED lamp form a circuit loop through conductive wires. Each of the left plate, the right plate and the upper plate includes a magnet therein to cooperate with the magnetic induction switch.

Preferably, the reflector is arranged in the form of a triangular ring, and the reflector is disposed on an inner edge of the triangular plate.

Preferably, the main plate is provided with a recess to mate with the LED lamp. The LED lamp is located in the recess, and the LED lamp is not higher than the recess. The LED lamp is arranged in the form of a triangle, a triangular ring, or a 八-like character.

Preferably, the triangular plate further includes an illumination lamp and an illumination lamp switch. The illumination lamp is electrically connected with the power source. The illumination lamp switch is adapted for controlling the illumination lamp to be switched on or off. The illumination lamp is a high-brightness white LED lamp.

Preferably, the main plate is provided with a charging interface, and the charging interface is electrically connected with the power source.

Preferably, the main plate is provided with a USB interface, and the USB interface is electrically connected with the power source.

Preferably, the main plate is provided with a power indicator, and the power indicator is electrically connected with the power source.

Preferably, the bottom of the main plate is provided with a base. Two sides of the base are hingedly connected with two support rods. The front and the back of the base are provided with fixing bases respectively. Each of the fixing bases is provided with two fixing grooves for fixing the support rods.

Preferably, the base has an M shape.

According to the preferred embodiment, the present invention has the following advantages:

1. The triangular plate of the present invention can be unfolded through the switch, which is fast and convenient and can be realized by the magnetic induction switch and the magnets. When the triangle plate is unfolded, the LED lamp is switched on. When the triangle plate is folded, the LED lamp is switched off. The present invention achieves automatic illumination and a high degree of automation, and brings the user great convenience.

2. The warning triangle stand of the present invention can be selectively installed on any surface, and can be fixed by support rods, fasteners or pulleys, etc.

3. The LED lamp of the present invention can be arranged in the form of a triangle, a triangular ring, or a 八-like character, and is used in cooperation with the reflector to provide a warning effect in the haze weather.

4. The warning triangle stand of the present invention is provided with an illumination lamp, a charging interface, a USB interface and a power indicator to improve the efficiency of use.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
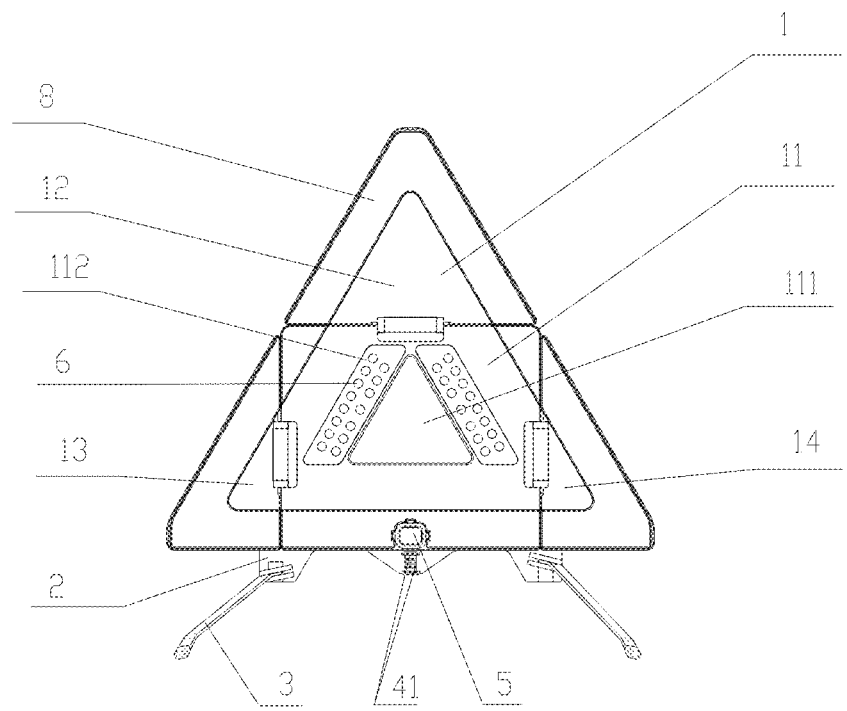
FIG. 1 is a front view of a warning triangle stand in accordance with an embodiment of the present invention.
Figure 2:
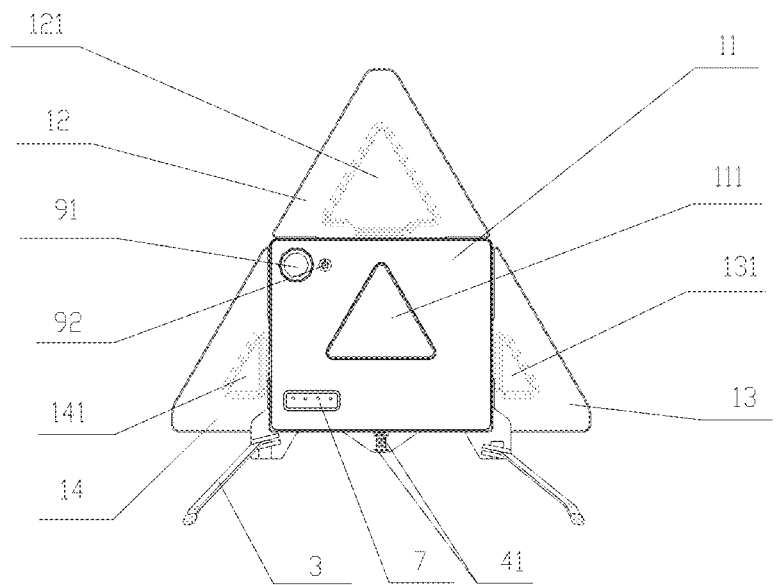
FIG. 2 is a rear view of FIG. 1.
Figure 3:
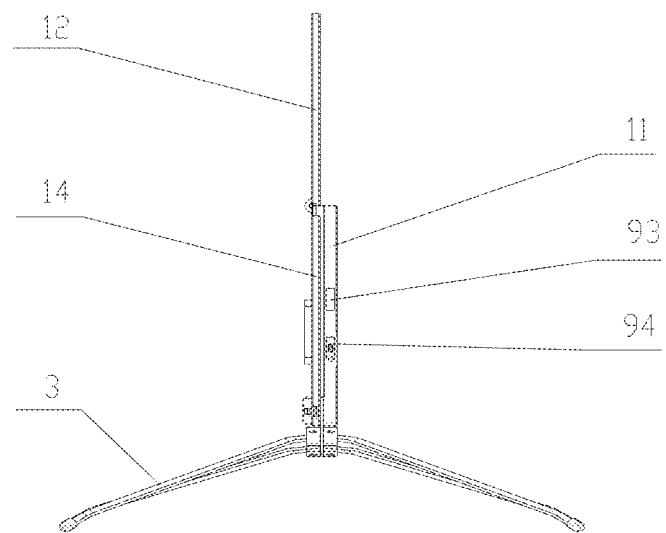
FIG. 3 is a right view of FIG. 1.
Figure 4:
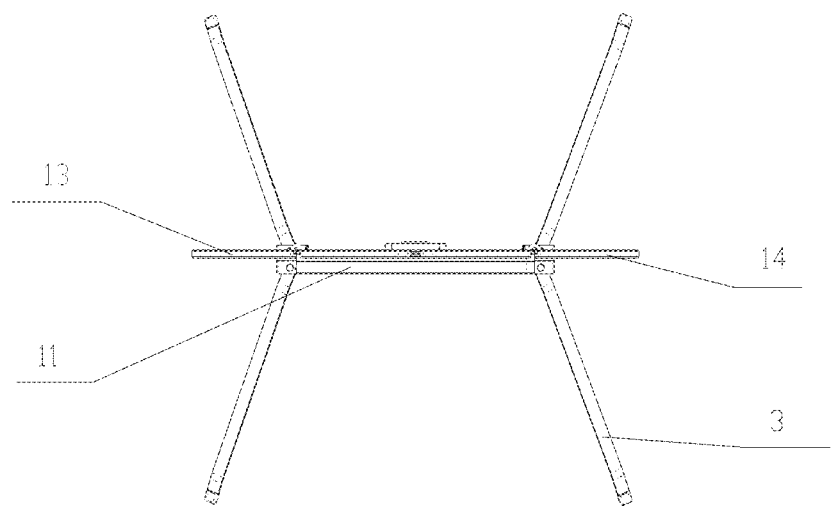
FIG. 4 is a bottom view of FIG. 1.
Figure 5:
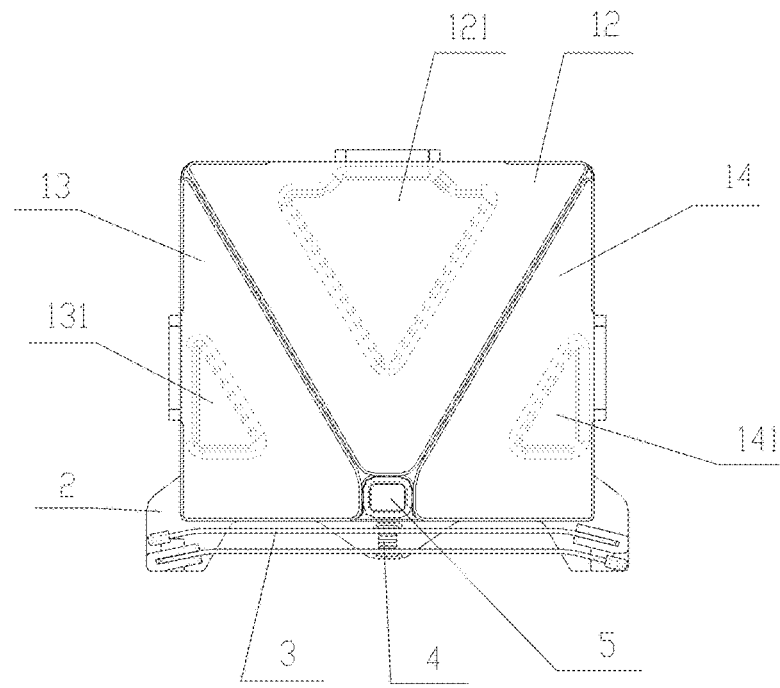
FIG. 5 is a schematic view of the warning triangle stand in a folded state in accordance with the embodiment of the present invention.
Figure 6:
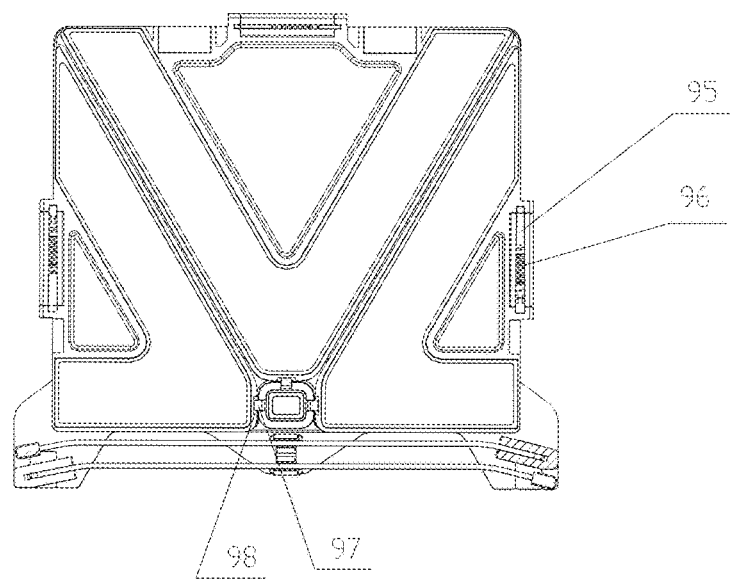
FIG. 6 is a sectional view of FIG. 5.

Referring to FIGS. 1 to 6, a warning triangle stand according to a preferred embodiment of the present invention is applicable to any traffic or area requiring for a warning. In particular, the warning triangle stand is a traffic sign used in cooperation with a reflector and an LED lamp. It should be appreciated that the warning triangle stand may be fixed on the horizontal plane through a base or fixed on the wall by a fastener or a hook.

As shown in FIGS. 1 to 6, the warning triangle stand comprises a triangular plate 1. The triangular plate 1 is provided with a reflector 8, an LED lamp 6, and a power source. The reflector 8 and the LED lamp 6 are disposed on the front of the triangular plate 1, respectively. The power source is disposed inside the triangular plate 1. The power source is electrically connected with the LED lamp. The power source supplies the electric power to the LED lamp 6. The light source of the LED lamp 6 may be yellow light having the haze-penetrating capability. The triangular plate 1 may include a main plate 11, a left plate 13, a right plate 14, and an upper plate 12. The left plate 13 and the right plate 14 are hinged to two sides of the main plate 11. The upper plate 12 is hinged to an upper end of the main plate 11. The hinge joints between the main plate 11 and the left plate 13, the right plate 14 and the upper plate 12 are provided with torsion springs 96, respectively. The front of the main plate 11 is provided with a switch 5. The switch 5 is provided with three engaging buckles 97. The left plate 13, the right plate 14 and the upper plate 12 are respectively provided with engaging recesses 98 to mate with the engaging buckles 97. The engaging recesses 98 are located at three vertexes of the triangular plate 1, respectively. The switch 5 is used to control the triangular plate 1 to be in a folded state or an unfolded state. In the folded state, the left plate 13, the right plate 14 and the upper plate 12 are folded and stored in the area of the main plate 11, and the engaging recesses 98 of the left plate 13, the right plate 14 and the upper plate 12 are buckled by the engaging buckles 97 of the switch 5. At this time, the switch 5 is exposed. In the unfolded state, the main plate 11, the left plate 13, the right plate 14, and the upper plate 12 are located on the same plane and arranged in the form of a triangle.

For the triangle plate 1 from the folded state to the unfolded state, the user can press the switch 5 and the three engaging buckles 97 on the switch 5 are disengaged from the engaging recesses 98 of the left plate 13, the right plate 14 and the upper plate 12, respectively. The left plate 13, the right plate 14, and the upper plate 12 are unfolded by the restoring force of the torsion springs 96, respectively. For the triangle plate 1 from the unfolded state to the folded state, the left plate 13, the right plate 14 and the upper plate 12 can be manually folded by the user to overcome the torsion of the torsion springs 96 so as to be stored in the area of the main plate 11, and the engaging recesses 98 of the left plate 13, the right plate 14 and the upper plate 12 are buckled by the engaging buckles 97 on the switch 5, respectively.

Each of the torsion springs 96 can be used in cooperation with a damping shaft 95 to prevent an excessive impact force of the left plate 13, the right plate 14 and the upper plate 12 when unfolded.

The triangular plate 1 is an isosceles triangle. The main plate 11 is a square. The left plate 13 and the right plate 14 are arranged symmetrically. Each of the left plate 13 and the right plate 14 is in the form of a right triangle. The upper plate 12 is an isosceles triangle.

The reflector 8 is arranged in the form of a triangular ring, and the reflector 8 is disposed on the inner edge of the triangular plate 1.

In this embodiment, a magnetic induction switch is provided inside the main plate 11. The magnetic induction switch, the power source and the LED lamp 6 form a circuit loop through conductive wires. The interior of the right plate 14 is provided with a magnet to cooperate with the magnetic induction switch. When the switch 5 controls the triangular plate 1 to be unfolded, the LED lamp 6 is switched on. When the triangular plate 1 is folded, the LED lamp 6 is switched off.

In other embodiments, the magnet is disposed inside the left plate 13.

In other embodiments, the magnet is disposed inside the upper plate 12.

In other embodiments, the main plate 11 is provided with an additional switch for controlling the LED lamp 6 to be switched on or off. That is to say, after the triangular plate 1 is unfolded through the switch 5, the additional switch is pressed to switch on the LED lamp 6.

In this embodiment, the LED lamp 6 is disposed on the main plate 11. The LED lamp 6 is arranged in the form of a 八-like character. The main plate 11 is provided with a recess 112 to mate with the LED lamp 6. When the LED lamp 6 is located in the recess 112, the LED lamp 6 is not higher than the recess 112.

In other embodiments, the LED lamp 6 is arranged in the form of a triangle, a triangular ring or the like.

In this embodiment, the back of the triangular plate 1 is provided with a first through hole 111. The shape of the first through hole 111 is similar to the shape of the triangular plate 1 in the unfolded state, which is an isosceles triangle.

The LED lamp 6 arranged in a 八-like character is located at two sides of the first through hole 111. The back of the upper plate 12 is provided with a second recess 121. The shape of the second recess 121 is similar to that of the upper plate 12. The back of the left plate 13 is provided with a third recess 131. The shape of the third recess 131 is similar to that of the left plate 13. The back of the right plate 14 is provided with a fourth recess 141. The shape of the fourth recess 141 is similar to that of the right plate 14.

In other embodiments, the back of the upper plate 12 is provided with a second through hole. The shape of the second through hole is similar to the shape of the upper plate 12. The back of the left plate 13 is provided with a third through hole. The shape of the third through hole is similar to the shape of the left plate 13. The back of the right plate 14 is provided with a fourth through hole. The shape of the fourth through hole is similar to that of the right plate 14.

In this embodiment, the triangular plate 1 is provided with an illumination lamp 91 and an illumination lamp switch 92 for controlling the illumination lamp 91 to be switched on or off. The illumination lamp 91 and the illumination lamp switch 92 are electrically connected with the power source, respectively. The illumination lamp 91 may be a high-brightness white LED lamp. The illumination lamp 91 may be disposed on the back of the main plate 11.

In other embodiments, the illumination lamp 91 may be disposed on the front of the main plate 11.

In this embodiment, the main plate 11 is further provided with a charging interface 94. The charging interface 94 is electrically connected with the power source. Through the charging interface 94, the power source is charged. The charging interface 94 may be disposed on the side of the main plate 11. The left plate 13, the right plate 14 and the upper plate 12 have the same thickness less than that of the main plate 11, so that the charging interface 94 is exposed.

In other embodiments, the charging interface 94 may be disposed on the back or the front of the main plate 11.

In this embodiment, the main plate 11 is further provided with a USB interface 93. The USB interface 93 is electrically connected with the power source. Through the USB interface 93, the main plate 11 may be connected with an external device for charging. The USB interface 93 may be disposed on the side of the main plate 11. The USB interface 93 and the charging interface 94 are disposed on the same side.

In other embodiments, the USB interface 93 may be disposed on the back or the front of the main plate 11.

In this embodiment, the back of the main plate 11 is provided with a power indicator 7. The power indicator 7 is electrically connected with the power source. The power indicator 7 is adapted for displaying the power of the power source, which is convenient for charging the power source immediately.

In other embodiments, the power indicator 7 may be disposed on the front of the main plate 11.

In this embodiment, the bottom of the main plate 11 is provided with a base 2. Two sides of the base 2 are hingedly connected with two support rods 3. The front and the back of the base 2 are provided with fixing bases 4, respectively. Each of the fixing bases 4 is provided with two fixing grooves 41 for fixing the support rods 3. The triangle stand is fixed on the ground by the four support rods which form four fulcrums. The four fulcrums may be fitted with rubber rings to enhance the friction against the ground so that the triangle stand can be fixed more stably. As the triangular plate and the support rods can be folded, it is convenient for storage and transportation. This is beneficial to be widely used.

In this embodiment, the base 2 may have an M shape.

In other embodiments, the two sides of the base 2 are provided with pulleys, respectively. Preferably, the pulleys are provided with braking devices. That is, the triangle stand is transported to a desired position through the pulleys and fixed by the braking devices so as to effectively prevent the triangle stand from moving to affect the use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A warning triangle stand, comprising:
 a triangular plate, the triangular plate being provided with a reflector,
 an LED lamp, and a power source, the reflector and the LED lamp being disposed on a front of the triangular plate respectively, the power source being disposed inside the triangular plate, the power source being electrically connected with the LED lamp;
 the triangular plate including a main plate, a left plate, a right plate and an upper plate, the left plate and the right plate being hinged to two sides of the main plate, the upper plate being hinged to an upper end of the main plate, hinge joints between the main plate and the left plate, the right plate and the upper plate being provided with torsion springs respectively, the front of the main plate being provided with a switch, the switch being provided with three engaging buckles, the left plate, the right plate and the upper plate being provided with engaging recesses respectively to mate with the engaging buckles, the engaging recesses being located at three vertexes of the triangular plate respectively;
 the switch being used to control the triangular plate to be in a folded state or an unfolded state, in the folded state, the left plate, the right plate and the upper plate being folded and stored in the main plate, the engaging recesses of the left plate, the right plate and the upper plate being buckled by the engaging buckles of the switch; in the unfolded state, the main plate, the left plate, the right plate, and the upper plate being located on a same plane and arranged in the form of a triangle;
 wherein the main plate includes a magnetic induction switch therein, the magnetic induction switch, the power source and the LED lamp form a circuit loop through conductive wires, and each of the left plate, the right plate and the upper plate includes a magnet therein to cooperate with the magnetic induction switch.

2. The warning triangle stand as claimed in claim 1, wherein the reflector is arranged in the form of a triangular ring, and the reflector is disposed on an inner edge of the triangular plate.

3. The warning triangle stand as claimed in claim 1, wherein the main plate is provided with a recess to mate with the LED lamp, the LED lamp is located in the recess, and the LED lamp is not higher than the recess;
 wherein the LED lamp is arranged in the form of a triangle, a triangular ring, or a 八-like character.

4. The warning triangle stand as claimed in claim 1, wherein the triangular plate further includes an illumination lamp and an illumination lamp switch, the illumination lamp is electrically connected with the power source, the illumination lamp switch is adapted for controlling the illumination lamp to be switched on or off, and the illumination lamp is a high-brightness white LED lamp.

5. The warning triangle stand as claimed in claim 1, wherein the main plate is provided with a charging interface, and the charging interface is electrically connected with the power source.

6. The warning triangle stand as claimed in claim 1, wherein the main plate is provided with a USB interface, and the USB interface is electrically connected with the power source.

7. The warning triangle stand as claimed in claim 1, wherein the main plate is provided with a power indicator, and the power indicator is electrically connected with the power source.

8. The warning triangle stand as claimed in claim 1, wherein a bottom of the main plate is provided with a base, two sides of the base are hingedly connected with two support rods, a front and a back of the base are provided with fixing bases respectively, and each of the fixing bases is provided with two fixing grooves for fixing the support rods.

9. The warning triangle stand as claimed in claim 8, wherein the base has an M shape.

* * * * *